Patented Dec. 9, 1930

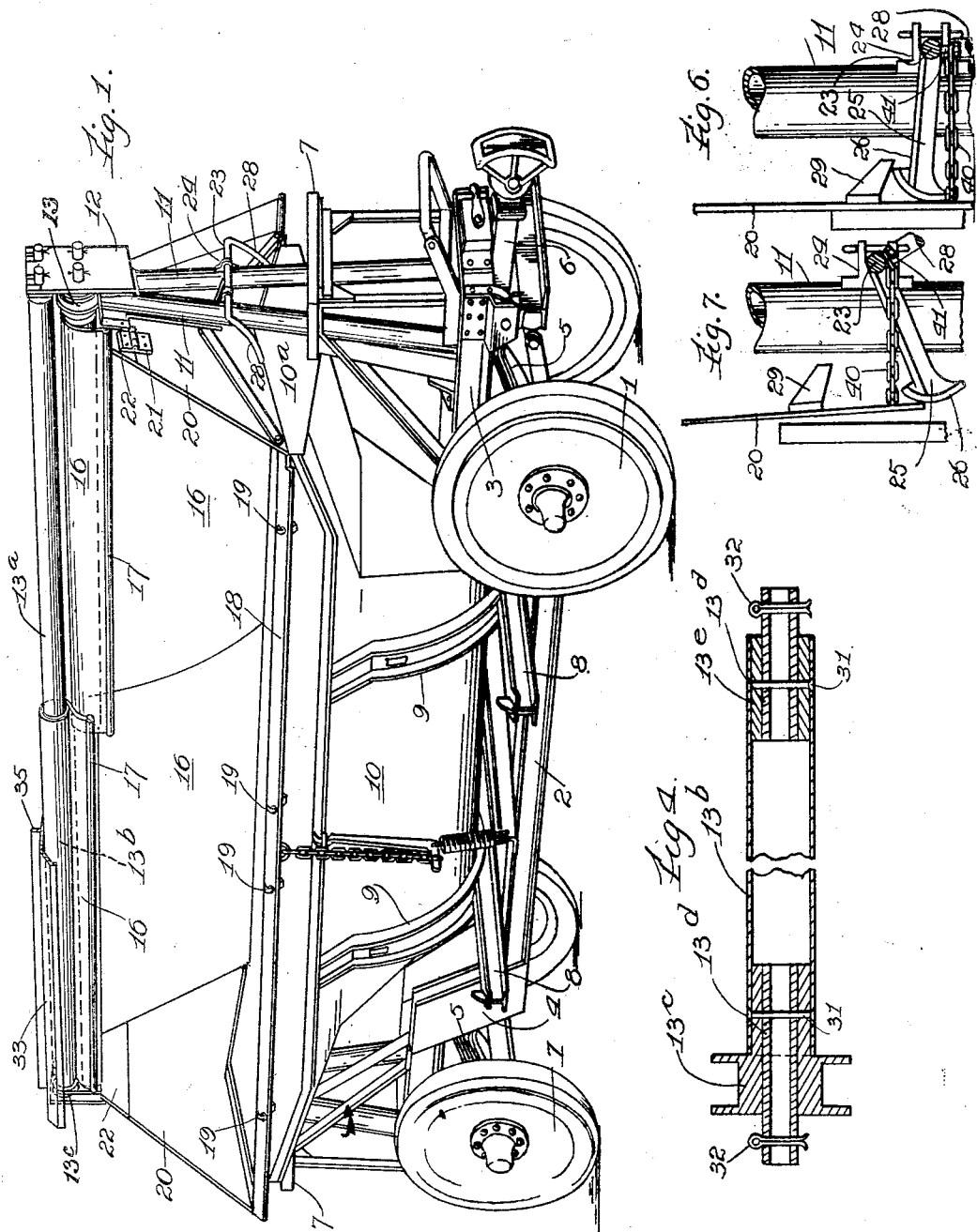

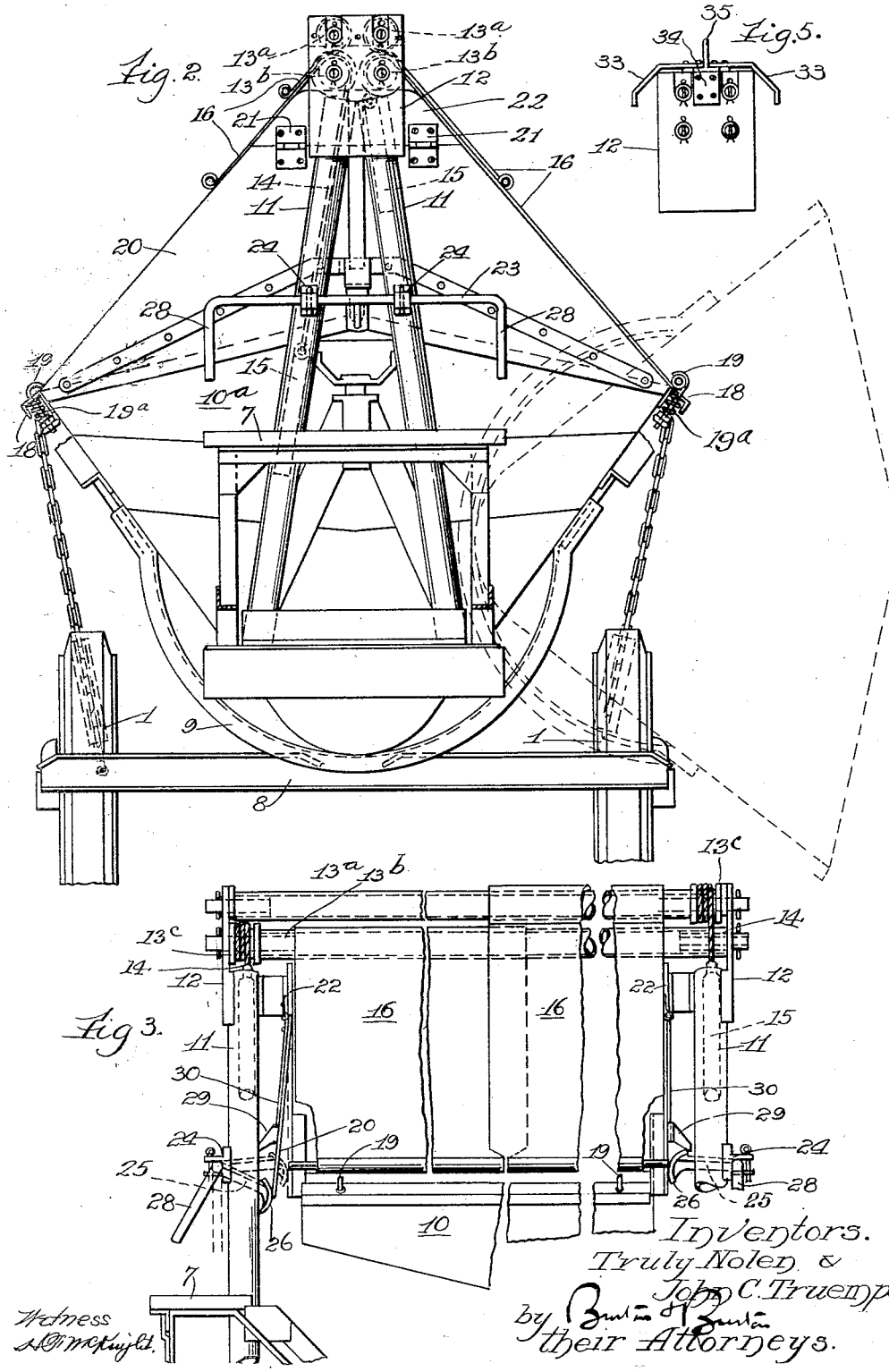

1,784,248

UNITED STATES PATENT OFFICE

TRULY NOLEN AND JOHN C. TRUEMPER, OF INDIANAPOLIS, INDIANA, ASSIGNORS TO HIGHWAY TRAILER COMPANY, OF EDGERTON, WISCONSIN, A CORPORATION OF WISCONSIN

ROLL-TOP COVER FOR DUMPING VEHICLES

Application filed February 5, 1927. Serial No. 166,115.

This invention relates to dumping vehicle bodies adapted for use in garbage and ash collection and similar purposes, and the invention is directed to means for covering such a body when the body itself is mounted for tilting or rolling to discharge its load, one object of the invention being to provide a cover of such light weight or so mounted in relation to the body that it will not interfere with the normal tilting movement. Such a cover is required to substantially close the space above the body in order to exclude flies from the contents and to prevent spillage and dissemination of unpleasant odors. Another object of the invention is to provide a cover which shall be economical to manufacture and mechanically simple so that it shall be reliable in operation. The invention consists in certain features and elements of construction as herein shown and described and as indicated by the claims.

In the drawings:

Figure 1 is a perspective view of a trailer type of vehicle provided with a rolling hopper body and fitted with covers embodying this invention.

Figure 2 is a front elevation showing parts of the vehicle structure diagrammatically and parts in section.

Figure 3 is a partial side elevation of the covers and supporting and operating means therefor.

Figure 4 is a detailed section taken axially through one of the rollers.

Figure 5 is a detailed end elevation showing a roof or cover member for rollers.

Figures 6 and 7 are detailed elevations of a modified form of locking device for the end cover plates, showing the device respectively in closing and opening position.

As shown in the drawings, the trailer vehicle chosen for purposes of illustration comprises four wheels, 1, supporting a drop frame having lower members, 2, with upper members, 3, at its ends connected to the lower members by plates, 4, and extending over the axles, and springs, 5, associated with the wheels, 1. At one or both ends a suitable draw bar, 6, is provided for connection with a motor truck or team of horses. Seats, 7, 7, are shown at each end of the vehicle for the driver or operator, and cross rails, 8, 8, mounted on the frame members, 2, support the curved rockers, 9, 9, which are attached to the hopper body, 10, to permit it to roll laterally for discharging its load. This construction is merely typical of vehicles adapted for the use indicated.

The hopper body, 10, is upwardly open and in order to support the covering means of this invention independently of the body, 10, so that it shall not interfere with its rolling movement, we provide an upright framework at each end of the vehicle which consists preferably of a pair of tubular members, 11, shown converging upwardly for connection by a plate, 12. The plates, 12, provide journal bearings for two pairs of awning rollers, $13^a$ and $13^b$, respectively, the rollers, $13^a$, being mounted directly above the rollers, $13^b$. Each of the rollers is fitted at one end with a flanged pulley or drum, $13^c$, on which is wound a flexible cable, 14, or the like, supporting a weight, 15, which is slidable up and down in one of the tubes, 11. Each roller also supports a flexible curtain of such material as rubber sheeting or canvas extending approximately over one-half the length of the roller and of a length sufficient to reach from the roller in an inclined direction downwardly to the flanged edge of the side of the body, 10, when the latter is in upright load-carrying position. The outer end of each curtain, 16, has a hem enclosing a stiffening rod at 17, by which the curtain may be grasped for manipulating it, much in the same manner as a window shade,—the cable, 14, and weight, 15, tending to turn the roller in the proper direction for winding up the curtain, 16, and furnishing a yielding resistance against which it is unreeled to serve as a cover for the body, 10. When thus drawn down to meet the flange, 18, at the edge of the body, the end of the curtain, reenforced by the rod, 17, may be fastened by hooks, 19, which are spring-pressed downwardly against the flange, 18, by springs, $19^a$, on the stems of the hooks, as seen in Figure 2.

The curtains, 16, on the upper rollers, $13^a$, are rolled so as to feed off the lower side of the roller, while the curtain on the lower rollers, 13$^b$, feed off the upper side of the roller and each curtain is slightly longer than half the length of its roller. Thus at each side of the body there are two curtains, one extending from the roller, 13$^b$, and the other from the upper roller, 13$^a$, adapted to slant downwardly in substantially the same plane and slightly overlapping at the middle of the length of the vehicle. Figure 1 shows both curtains at the near side of the body raised, while the two curtains at the far side of the body are shown drawn down in engagement with the body flange, 18.

The body, 10, has end walls, 10$^a$, but these walls do not extend as high as the curtain rollers; therefore, to complete the enclosure, we provide end plates, 20, attached by hinges, 21, to supports, 22, carried by the upright tubes, 11, at each end of the vehicle. A rock shaft, 23, extends horizontally in bearing brackets, 24, on the tubes, 11, and has an arm, 25, preferably formed with a cam-shaped end at 26, adapted to press against the cover plate, 20, forcing it into close engagement with the upper edge of the end wall, 10$^a$. Handles, 28, are provided at both ends of the rock shaft, 23, and a stop lug, 29, on the plate, 20, limits the enclosing movement. A flat spring arm, 30, anchored on the support, 22, and attached at its lower end to the cover plate, 20, tends to swing the plate open when the pressure of the cam face, 26, is relieved by turning the rock shaft, 23, so that the plate, 20, will not interfere with the rolling movement of the body, 10, in discharging its load. When the body is to be dumped the curtains, 16, are preferably released from the hooks, 19, and raised clear of the path of the body by the action of the counter-weights, 15, in the tubes, 11.

However, as a matter of convenience and saving of time, the covers on the side of the body opposite the direction in which the body is to be dumped, may remain connected to the edge of the body during the dumping operation. It will be clear that as the edge of the body moves upwardly (during the early part of the dumping movement) the covers will be gradually wound up on their rollers by the cables, 15, and counterweights, 16, and as said edge of the body passes beyond the rollers the covers are paid out an amount corresponding to the extent of movement of the edge of the body, under the control of their cables and weights. As is apparent, the "paying" in and out of the covers during the dumping movement of the body protects them against possible damage, and at the same time causes them to act as a snubber, tending to check the body as it approaches its extreme positions.

In the collection of garbage or ashes the load is usually picked up in small quantities at intervals along a route, and the provision of several curtains, 16, permits keeping all but one of the curtains closed at any one time, leaving only a small area of the load exposed, and thus materially checking the dissemination of dust or unpleasant odors. When the load is to be hauled for any considerable distance from the district in which it is collected, all the covers may be closed until arrival at the point of disposal.

Figure 4 shows the preferred construction for the curtain rollers in which the flanged pulley, 13$^c$, is formed with a hub which fits snugly into a sheet metal tube, 13$^b$, which constitutes the roller for the curtain. At the other end of the tube a cylindrical filler, 13$^e$, is inserted; bearing spindles are provided in the form of short sections of pipe, 13$^d$, secured in the filler, 13$^e$, and in the pulley and projecting from the ends of these parts for support in the bearing plates 12. The assembled parts at each end of the roller may be secured by riveted cross pins 31, and cotter pins 32 are shown for retaining the spindles in position in the plates 12.

As indicated in Figures 1 and 5, a central roof or cover, 33, may be provided over the rollers extending longitudinally between the bearing plates 12 and supported from said plates by any suitable form of brackets, 34. To avoid any tendency of this cover member to sag, it may include a T-rail arranged with its medio flange 35 extending upwardly between the two pieces, of which the cover 33 is composed and which are united by securement to the web of said rail.

Figures 6 and 7 illustrate an alternative form of locking means for the end plate 20 in which a rock shaft, 23, is provided with the cam ended arm, 25, already described, but has in addition a chain, 40, connected at one end to the cover 20 and at the other end to the shaft 23 so that when the shaft is turned in the direction for releasing the cam 26, it will wind up the chain 40 and thus positively pull the cover 20 away from the end wall of the body.

We claim:

1. In a vehicle of the type described, including an upwardly open body and a frame on which it is tiltably mounted, a plurality of rollers extending longitudinally over the body and supporting means therefor upstanding from the frame beyond the ends of the body, said supporting means including tubular upright members, flexible covers wound on the rollers respectively adapted to extend over the body, and yielding means for turning each roller in the direction for winding up its cover, comprising a weight guided for up-and-down movement in one of the tubular uprights, and a flexible connector extending from the weight around the roller.

2. In combination with an upwardly open vehicle body, flexible covering means therefor comprising a plurality of rollers extending longitudinally over the body, one of said rollers being mounted directly above another, a flexible curtain wound on one roller dimensioned to extend over a part of the length of the body, a flexible cover wound on the other roller dimensioned to extend over a different part of the length of the body, the adjacent marginal portions of said covers being arranged to overlap each other when the covers are unwound, the cover of the upper roller unwinding from the under side thereof and the cover of the lower roller unwinding from off the upper side thereof, whereby said overlapping marginal portion will lie closely adjacent the same plane for contact with each other.

3. In a vehicle which includes an upwardly open body and a frame on which it is tiltably mounted, supports extending up from the frame beyond the ends of the body, rollers carried by said supports above the body, flexible covers wound on said rollers respectively and extensible by unwinding toward opposite sides of the body, together with end plates for completing the enclosure, supported on said uprights in substantially vertical planes adjacent the ends of the body, said end plates being movable into and out of engagement with said ends, and manually operable means on the supports for so moving them.

Executed at Indianapolis, Indiana, under date of January fifteenth, 1927.

TRULY NOLEN.
JOHN C. TRUEMPER.